United States Patent [19]

Fujimura et al.

[11] Patent Number: 5,013,061
[45] Date of Patent: May 7, 1991

[54] HYDRAULIC CIRCUIT FOR ACTIVELY CONTROLLED AUTOMOTIVE SUSPENSION SYSTEM WITH FAIL-SAFE SYSTEM

[75] Inventors: Itaru Fujimura; Naoto Fukushima; Yukio Fukunaga; Yohsuke Akatsu, all of Kanagawa, Japan

[73] Assignee: Nissan Motor Company, Limited, Yokohama, Japan

[21] Appl. No.: 303,338

[22] Filed: Jan. 26, 1989

[30] Foreign Application Priority Data

Jan. 26, 1988 [JP] Japan ................................. 63-15480

[51] Int. Cl.5 ............................................. B60G 17/015
[52] U.S. Cl. .................................... 280/707; 280/714
[58] Field of Search ................ 280/714, 707, DIG. 1, 280/840; 364/424.05; 188/299; 267/64.28

[56] References Cited
U.S. PATENT DOCUMENTS 4,702,490 10/1987 Yamaguchi et al. ................. 280/707

FOREIGN PATENT DOCUMENTS

0249209 12/1987 European Pat. Off. .
0249227 12/1987 European Pat. Off. .
0283004 9/1988 European Pat. Off. .
0284053 9/1988 European Pat. Off. .
0285153 10/1988 European Pat. Off. .
3638574 5/1988 Fed. Rep. of Germany .
3742883 7/1989 Fed. Rep. of Germany .

Primary Examiner—Charles A. Marmor
Assistant Examiner—Karin Tyson
Attorney, Agent, or Firm—Foley, Lardner, Schwartz, Jeffery, Schwaab, Mack, Blumenthal & Evans

[57] ABSTRACT

An an actively controlled suspension system includes a fail-safe system which is associated with a pressure control valve and detective of failure of a control circuit to perform fail-safe operation. The fail-safe system operates the pressure control valve in response to failure of the control circuit, to fix the valve position corresponding to a working fluid pressure in a working chamber defined in a suspension cylinder disposed between a vehicular body and a suspension member rotatably supporting a vehicular wheel, at a pressure value at or in the vicinity of a predetermined initial or neutral pressure.

13 Claims, 6 Drawing Sheets

HYDRAULIC CIRCUIT FOR ACTIVELY CONTROLLED AUTOMOTIVE SUSPENSION SYSTEM WITH FAIL-SAFE SYSTEM

BACKGROUND OF THE INVENTION

1. Field of the Invention

The present invention relates generally to an actively controlled suspension system for an automotive vehicle, which controls suspension characteristics depending upon vehicle driving conditions in order to suppress attitude change of a vehicular body. More specifically, the invention relates to a hydraulic circuit construction with a fail-safe system in the actively controlled suspension system, which fail-safe system performs fail-safe operation in response to failure of components of the suspension control system, particularly electric circuitry.

2. Description of the Background Art

U.S. Pat. No. 4,702,490, issued on Oct. 27, 1987, which has been assigned to the common owner to the present invention, discloses a typical construction of an actively controlled suspension system, in which a hydraulic cylinder defining a working chamber is disposed between a vehicular body and a suspension member rotatably supporting a vehicular wheel. The working chamber of the hydraulic cylinder is communicated with a hydraulic circuit including a pressurized working fluid source. A pressure control valve, such as a proportioning valve assembly, is disposed in the hydraulic circuit, which is connected to an electric or electronic control circuit which controls the valve position. The pressure control valve is controls the valve position by a suspension control signal produced in the control circuit for adjusting pressure in the working chamber and thereby controlling suspension characteristics.

On the other hand, European Patent No. 0 283 004, 0 285 153 and 0 284 053 disclose technologies for controlling the suspension systems constructed as set forth above, depending upon the vehicle driving condition for suppressing rolling and/or pitching of the vehicular body.

As will be appreciated, for the automotive suspension systems, very high security has been required to assure safety in driving. Therefore, for the actively controlled suspension systems set forth above, it is important to assure safety at any vehicular driving condition. Furthermore, security is required for such electrically or electronically controlled suspension systems even when one of the components of the suspension control system fails.

SUMMARY OF THE INVENTION

Therefore, it is an object of the present invnetion to provide an actively controlled suspension system which can assure safety all the way in driving.

Another object of the invention is to provide a fail-safe system which can assure safety all the way in driving.

A further object of the invention is to provide a fail-safe system which can perform fail-safe operation in response to failure of a control circuit.

In order to accomplish aforementioned and other objects, an actively controlled suspension system, according to the present invention, includes a fail-safe system which is associated with a pressure control valve and detective of failure of a control circuit to perform fail-safe operation. The fail-safe system operates the pressure control valve in response to failure of the control circuit, to fix the valve position corresponding to a working fluid pressure in a working chamber defined in a suspension cylinder disposed between a vehicular body and a suspension member rotatably supporting a vehicular wheel, at a pressure value at or in the vicinity of a predetermined initial or neutral pressure.

According to one aspect of the invention, an actively controlled suspension system comprises a suspension system interposed between a vehicular body and a suspension member rotatably supporting a vehicular wheel, said suspension system including a variable pressure chamber which is filled with a working fluid and variable of the pressure of said working fluid across a predetermined neutral pressure within said variable pressure chamber for varying suspension characteristics. The system also includes a fluid circuit means, connected to said variable pressure chamber and to a fluid pressure source which circulates pressurized fluid in said fluid circuit A first valve means is disposed in said fluid circuit and variable of valve position for adjusting pressure supply for said variable pressure chamber from said fluid circuit, and has a first port connected to said fluid pressure source via a supply line of said fluid circuit to be supplied the pressurized fluid therethrough, a second port connected to said fluid pressure source via a drain line for draining pressurized fluid therethrough, and a third port connected to said variable pressure chamber via a pressure control line. A second valve second valve means is disposed between said first valve means and said fluid pressure source. The second valve means permits fluid flow from said pressurized fluid source to said first valve means and blocks fluid flow in the opposite direction at first valve position. At a second valve position, the second valve means permits fluid flow from said first valve means to said pressurized fluid source when the fluid pressure at said supply line is higher than a predetermined threshold level and block fluid flow in the opposite direction, and blocks fluid communication between said pressurized fluid source and said first valve means when the fluid pressure at said supply line is lower than or equal to said threshold level.

The system further includes a sensor means for monitoring preselected suspension control parameter to produce a sensor signal representative thereof, and a fail detector means for monitoring control signal supplied to said first valve means and detecting abnormality of said control signal. A controller means normally produces said control signal on the basis of said sensor signal for adjusting pressure to be introduced in to said pressure and thus for adjusts suspension characteristics in order to suppress attitude change in said vehicular body. The controller means is responsive to said detector means detecting abnormality of said control signal, to output a line pressure control signal to be fed to said second valve means for switching valve position from said first position to second position in order to maintain the line pressure in said fluid circuit at a pressure higher than or equal to said predetermined threshold level.

The second valve means may comprise a fluid pressure responsive valve means which permits fluid flow from said first valve means to said fluid pressure source when said fluid pressure at said supply line is higher than said predetermined threshold level which corresponds to said neutral pressure and blocks fluid flow from said first valve means to said fluid pressure source when said fluid pressure is lower than or equal to said neutral pressure. The fluid pressure source may further comprise a pressure regulation valve means having a set pressure higher than said neutral pressure, and maximum fluid pressure to be supplied to said fluid circuit via said second valve means at said first position corresponds to said set pressure of said pressure regulation valve. In the preferred construction, the actively controlled suspension system further comprises a pressure accumulator means connected to said fluid circuit for accumulating fluid pressure therein, said pressure accumulator means being oriented between said first and second valve means.

According to another aspect of the invention, an actively controlled suspension system comprises a suspension system interposed between a vehicular body and a suspension member rotatably supporting a vehicular wheel. The suspension system of this aspect includes a hydraulic cylinder defining therein a variable pressure chamber which is filled with a hydraulic working fluid and is variable of the pressure across a predetermined neutral pressure within said variable pressure chamber for varying suspension characteristics. A hydraulic circuit means is connected to said variable pressure chamber and to a fluid pressure source which circulates pressurized fluid in said fluid circuit and includes first and second supply lines for supplying pressurized fluid to said variable pressure chamber and first and second drain lines for returning pressurized fluid from said variable pressure chamber to said pressurized fluid source.

A first valve means is disposed in said fluid circuit and connected to said variable pressure chamber via a pressure control line, and is variable of valve position for adjusting pressure supply for said variable pressure chamber from said fluid circuit. The first valve means has a first port connected to said fluid pressure source via said first supply line of said fluid circuit to be supplied the pressurized fluid therethrough, a second port connected to said fluid pressure source via said first drain line for draining pressurized fluid therethrough, and a third port connected to said variable pressure chamber via a pressure control.

A second valve means is disposed within said fluid circuit and has a first port connected to said first supply line, a second port connected to said second supply line and a third port connected one of said first and second drain lines. The second valve means selectively establishes fluid communication between said first and second ports at a first mode position and between said first and third port at a second mode position. The first mode position is selected for permitting fluid flow from said pressurized fluid source to said first valve means via said first and second supply lines and blocks fluid flow from said first supply line to said first drain line, and said second mode position is selected for permitting fluid flow from said first supply line to said pressurized fluid source via said first and second drain lines A third valve means is disposed between said first and second drain lines and is responsive to fluid pressure in said first supply line higher than a preset neutral pressure of said variable pressure chamber. The third valve means permits fluid flow from said first drain line to said second drain line and blocks fluid communication between said first and second drain lines when said fluid pressure in said first supply line is lower than or equal to said neutral pressure.

A sensor means monitors preselected suspension control parameter to produce a sensor signal representative thereof and a fail detector means monitors control signal supplied to said first valve means and detecting abnormality of said control signal.

In addition, a controller means normally produces said control signal on the basis of said sensor signal for adjusting pressure to be introduced in to said pressure and thus for adjusting suspension characteristics in order to suppress attitude change in said vehicular body. The controller means is responsive to said detector means detecting abnormality of said driver signal, to output a line pressure control signal to be fed to said second valve means for switching valve position from said first mode position to second mode position in order to maintain the line pressure in said fluid circuit at said a predetermined value.

According to a further aspect of the invention, an actively controlled suspension system comprises a suspension system interposed between a vehicular body and a suspension member rotatably supporting a vehicular wheel and includes a variable pressure chamber which is filled with a working fluid and variable of the pressure of said working fluid across a predetermined neutral pressure within said variable pressure chamber for varying suspension characteristics.

A fluid circuit means, connected to said variable pressure chamber and to a fluid pressure source which circulates pressurized fluid in said fluid circuit.

A first valve means is disposed in said fluid circuit and is variable of valve position for adjusting pressure supply for said variable pressure chamber from said fluid circuit and has a first port connected to said fluid pressure source via a supply line of said fluid circuit to be supplied the pressurized fluid therethrough, a second port connected to said fluid pressure source via a drain line for draining pressurized fluid therethrough, and a third port connected to said variable pressure chamber via a pressure control. A second valve means is disposed between said drain line of said fluid circuit and said fluid-pressure source for permitting fluid flow from said pressurized fluid source to said first valve means and blocks fluid flow in the opposite direction at first valve position, and permitting fluid flow from said first valve means to said pressurized fluid source when the fluid pressure at said supply line is higher than a predetermined threshold level and block fluid flow in the opposite direction. A flow restriction means is disposed within said drain line for limiting fluid flow therethrough from said drain line to said fluid pressure source for regulating fluid pressure in said supply line and said drain line.

A sensor means monitors preselected suspension control parameters to produce a sensor signal representative thereof, and a fail detector means for monitoring control signal supplied to said first valve means and detecting abnormality of said control signal.

In addition, controller means produces said control signal on the basis of said sensor signal for adjusting pressure to be introduced in to said pressure and thus for adjusting suspension charcteristics in order to suppress attitude change in said vehicular body. The controller means is responsive to said detector means detecting abnormality of said driver signal, to output a line pressure control signal to be fed to said second valve means for switching valve position from said first position to second position in order to maintain the line pressure in said fluid circuit at a pressure higher than or equal to said predetermined threshold level.

It may be preferable to construct the actively controlled suspension system by further providing a bypass circuit with pressure difference responsive valve means for bypassing said first valve means for directly connecting said drain line to said pressure control line and which is responsive to the fluid pressure in said drain line higher than the fluid pressure in said pressure control line for establishing fluid communication and responsive to the fluid pressure in said pressure control line higher than that in said drain line for blocking fluid communication. The actively controlled suspension system may further comprise a flow restricting means disposed within said bypass circuit downstream of said pressure difference responsive valve means for limiting fluid flow through said bypass circuit when fluid communication is established by said pressure difference responsive valve means.

According to a still further aspect of the invention, an actively controlled suspension system comprises a suspension system interposed between a vehicular body and a suspension member rotatably supporting a vehicular wheel and including a hydraulic cylinder defining therein a variable pressure chamber which is filled with a hydraulic working fluid and variable of the pressure across a predetermined neutral pressure within said variable pressure chamber for varying suspension characteristics. A hydraulic circuit means is connected to said variable pressure chamber and to a fluid pressure source and circulates pressurized fluid in said fluid circuit and includes first and second supply lines for supplying pressurized fluid to said variable pressure chamber and first and second drain lines for returning pressurized fluid from said variable pressure chamber to said pressurized fluid source.

A first valve means is disposed in said fluid circuit and is connected to said variable pressure chamber via a pressure control line. The first valve means is variable of position for adjusting pressure supply for said variable pressure chamber from said fluid circuit and has a first port connected to said fluid pressure source via said first supply line of said fluid circuit to be supplied the pressurized fluid therethrough, a second port connected to said fluid pressure source via said first drain line for draining pressurized fluid therethrough, and a third port connected to said variable pressure chamber via a pressure control.

A second valve means is disposed within said fluid circuit and has a first port connected to said first supply line, a second port connected to said second supply line and a third port connected one of said first and second drain lines. The second valve means selectively establishes fluid communication between said first and second ports at a first mode position and between said first and third port at a second mode position. The first mode position is selected for permitting fluid flow from said pressurized fluid source to said first valve means via said first and second supply lines and blocks fluid flow from said first supply line to said first drain line. The said second mode position is selected for permitting fluid flow from said first supply line to said pressurized fluid source via said first and second drain lines.

A third valve means is disposed between said first and second drain lines and is responsive to fluid pressure in said first supply line higher than a preset neutral pressure of said variable pressure chamber, for permitting fluid flow from said first drain line to said second drain line and for blocking fluid communication between said first and second drain lines when said fluid pressure in said first supply line is lower than or equal to said neutral pressure. A flow restriction means is disposed within said first drain line upstream of said third valve for limiting fluid flow therethrough for regulating fluid pressure in said fluid circuit upstream thereof.

A sensor means monitors preselected suspension control parameter to produce a sensor signal representative thereof, and a fail detector means monitors control signals supplied to said first valve means and detects abnormality of said control signal.

In addition, a controller means produces said control signal on the basis of said sensor signal for adjusting pressure to be introduced in to said pressure and thus for adjusting suspension characteristics in order to suppress attitude change in said vehicular body. The controller means is responsive to said detector means detecting abnormality of said driver signal, to output a line pressure control signal to be fed to said second valve means for switching valve position from said first mode position to second mode position in order to maintain the line pressure in said fluid circuit at said a predetermined value.

BRIEF DESCRIPTION OF THE DRAWINGS

In the drawings:

FIGS. 3(A) and 3(B) are sections showing the hydraulic pressure control valve of FIG. 2, in which FIG. 3(A) shows the valve position for reducing hydraulic pressure in the hydraulic cylinder for softening suspension characteristics, and FIG. 3(B) shows the valve position for increasing hydraulic pressure in the hydraulic cylinder for hardening the suspension characteristics;

DESCRIPTION OF THE PREFERRED EMBODIMENT

Figure 1:
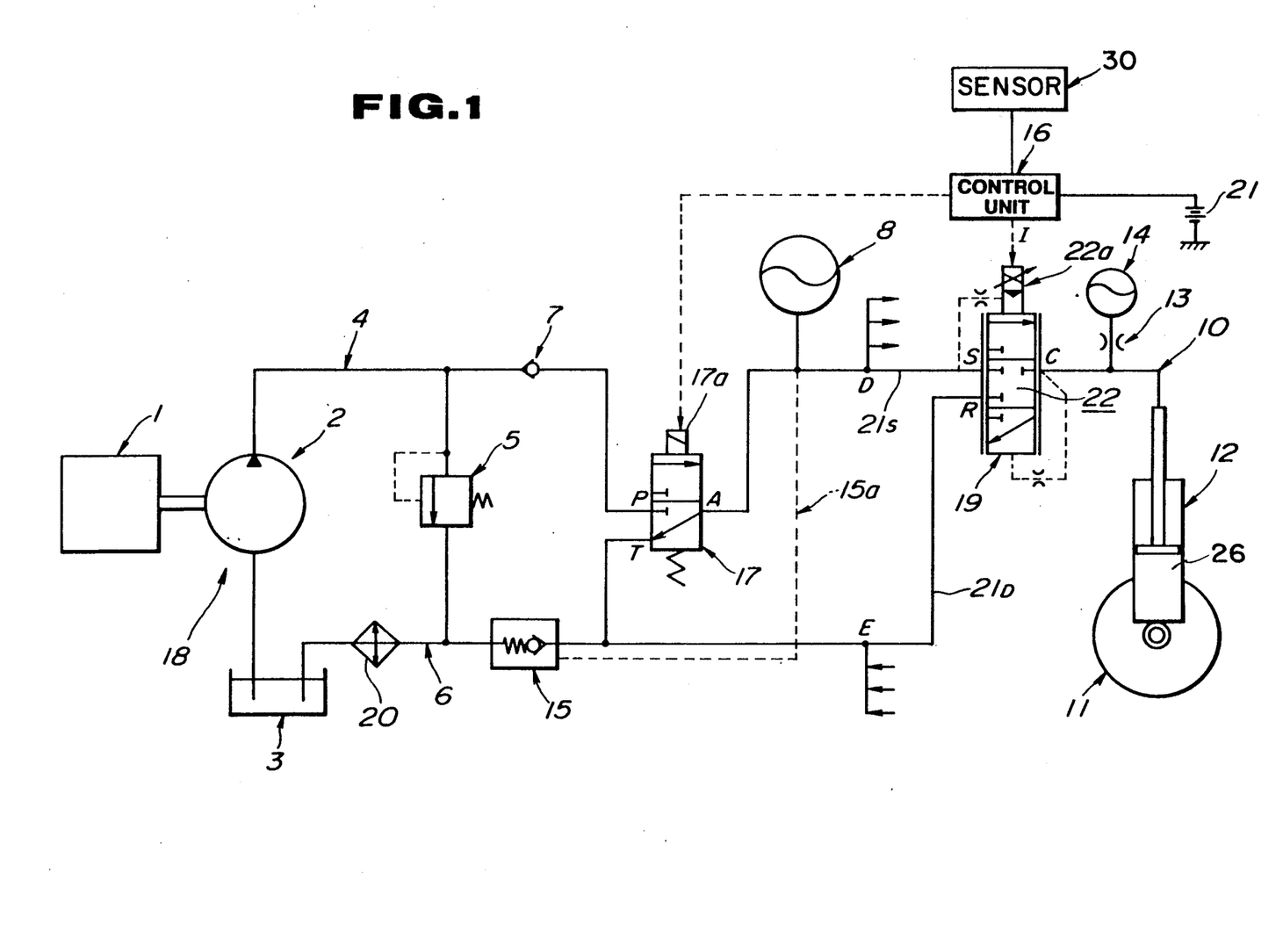
FIG. 1 is a diagrammatic illustration showing a first embodiment of a hydraulic circuit for an actively controlled automotive suspension system according to the present invention.

Referring now to the drawings, particularly to FIG. 1, the preferred embodiment of an actively controlled suspension system, according to the present invention, is designed to generate damping force or absorbing energy for suppressing relative displacement between vehicular wheel 11 which are rotatably supported by a suspension member in a known manner and a vehicular body and whereby suppressing attitude change of a vehicular body. Between each of the vehicular body and the corresponding vehicular wheel 11, a suspension assembly 12 is disposed for generating the damping force or absorbing road shock creating vibration energy. Each suspension assembly 12 comprises a hydraulic cylinder which is generally represented by the reference numberal 26 and a suspension coil spring (not shown). The hydraulic cylinder 26 is disposed between the suspension member and the vehicular body.

It should be appreciated that though only one hydraulic cylinder 26 is illustrated on the drawings, the identical construction of hydraulic cylinders are provided for the respective vehicular wheels.

Figure 2:
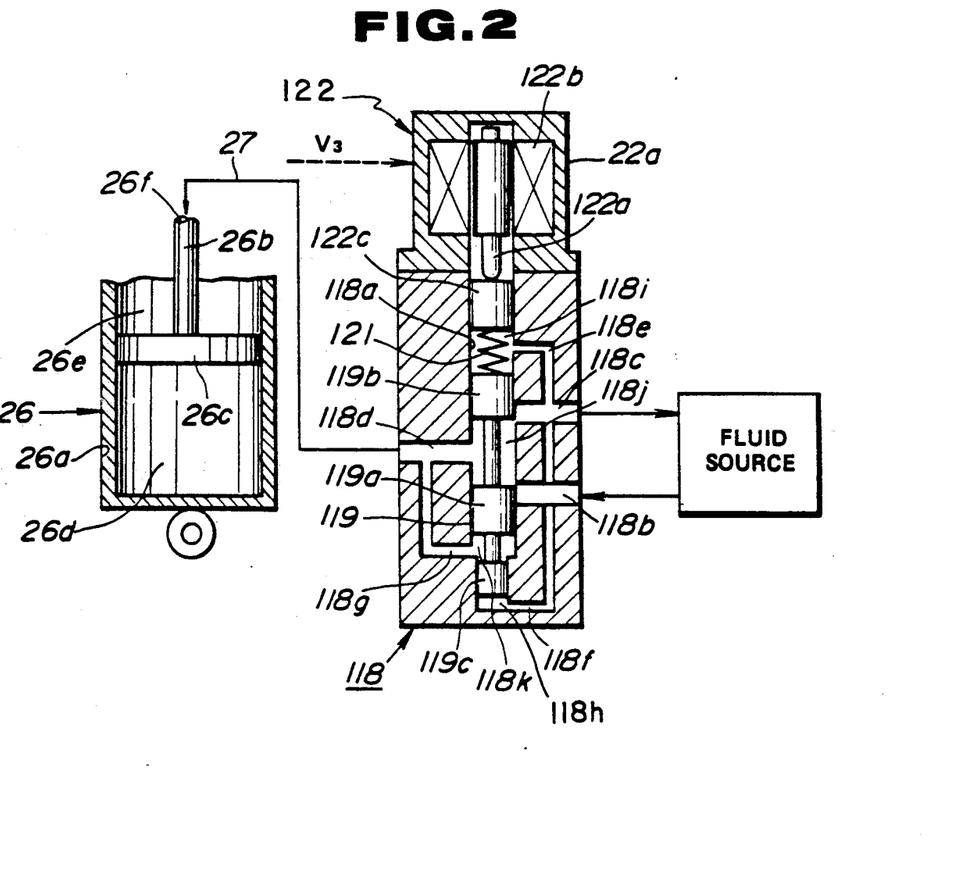
FIG. 2 is a section of one example of a hydraulic cylinder in combination with a hydraulic pressure control valve associated with the hydraulic cylinder for adjusting suspension characteristics depending upon vehicle driving condition.

The hydraulic cylinder 26 comprises a hollow cylinder body 26a connected to the suspension member at its lower end, as particularly shown in FIG. 2. The cylinder body 26a defines therein a hollow space, in which is thrustingly disposed a working piston 26c connected to the vehicular body 14 via a piston rod 26b. The piston in cooperation with the interior of the cylinder body 26a defines a working chamber 26d which is filled with a working fluid. The working chamber 26d of the hydraulic cylinder 26 is communicated with a hydraulic circuit via an axially extending opening (not shown) formed through the piston 26c and the piston rod 26b.

As seen from FIG. 1, the hydraulic circuit includes a pressurized fluid source unit 18 and a fluid flow control unit 19. The fluid flow control unit 19 operates at various operation mode positions i.e. a supply mode in which pressurized fluid supplied from the fluid source unit 18 is supplied to a supply line 21S, and a drain mode in which pressurized fluid from a drain line 21D is returned to the fluid source unit 18. Therefore, the line pressures in the supply and drain lines 21S and 21D are maintained constant. The supply and drain lines 21S and 21D are connected to the fluid flow control unit comprising a pressure control valve 22 connected to the working chambers 26d of the hydraulic cylinder 26 via pressure control lines 10. Pressure accumulator 8 is connected to the supply line 21S for accumulating excessive pressure. On the other hand, the working chambers 26d of the hydraulic cylinder 26 is connected to a pressure accumulator 14 via orifices 13.

The pressure accumulators 8 and 14 are diaphragm-type variable volume chambers each having an enclosed pneumatic chamber and a hydraulic chamber. The pressure is accumulated in each of the pressure accumulators with deformation of the diaphragm and with compresseds of the pneumatic chamber. The pneumatic pressure in the compressed pneumatic chamber serves as accumulated pressure.

The fluid source unit 18 comprises a fluid reservoir 3, a fluid pump 2 and a pressure regulation valve 5. The pressure regulation valve 5 is disposed between the outlet of the fluid pump 2 and the fluid reservoir 3 and connected to the outlet of the fluid pump 2 via a pressure source line 4 and to the reservoir 3 via a return line 6. The pressure regulation valve 5 is designed for regulating the output pressure of the fluid pump 2. A valve device is disposed in the fluid circuit for permitting fluid flow from fluid source 2 to the valve 19 and for blocking fluid flow in the opposite direction in a first mode. In a second mode, the valve device permits fluid flow from source 2 to valve 19 when the fluid pressure at the supply line is higher than a predetermined threshold level and concurrently blocks fluid flow in the opposite direction. The valve device is further operable to block fluid communication between the pressurized fluid source and valve 19 when the fluid pressure at the supply line is lower than or equal to a threshold level. To this end, the valve device is provided with a flow control valve and an operational one-way check valve.

In the embodiment illustrated in FIG. 1, the fluid pump 2 is connected to the inlet of a flow control valve 17 via a one-way check valve 7 which allows fluid flow from the fluid pump to the flow control valve and blocks fluid flow in the reverse direction. The flow control valve 17 also has a drain port connected to the return line 6 to return the pressurized fluid to the fluid reservoir 3. The flow control valve 17 is further provided with an outlet connected to the supply line 21S to supply the pressurized fluid to the latter. An operational one-way check valve 15 is provided in the return line 6 for permitting fluid flow to return to the fluid reservoir 3 and blocking fluid flow in the reverse direction. The operational one-way check valve 15 is responsive to the fluid pressure in the drain line 21D upstream thereof to allow the fluid to flow back to the fluid reservoir 3. The set pressure of the check valve 15 is set at a value corresponding to a predetermined neutral pressure of the working chamber 26d of hydraulic cylinder 26.

The flow control valve 17 is associated with an actuator 17a which is electrically operable for switching the valve position between a supply position in the supply mode, a drain position in the drain position mode and a flow blocking position in the flow blocking mode. The actuator 17a is electrically connected to a control circuit 16 which will be discussed in detail later. Similarly, the pressure control valve 22 is associated with an actuator 22a which is, in turn, connected to the control circuit 16. The actuator 22a associated with each respective pressure control valve 22 may comprise a proportioning solenoid for adjusting the valve position so that the open area available for fluid communication is proportional to a value of control signals from the control circuit. In the alternative, the actuator 22a can be an ON/OFF solenoid for controlling supply and drain amount of the fluid according to the duty cycle of the control signal which is a pulse train having a frequency corresponding to flow restriction magnitude.

The control circuit 16 generally receives a plurality of preselected suspension control parameter data from sensor means designated generally at 33 for performing suspension control and generating the control signals.

FIG. 2 shows one example of the pressure control valve to be employed in the shown embodiment of the suspension control system according to the invention.

FIG. 2 shows the detailed construction of the hydraulic cylinder 26 and the pressure control valve 22. As will be seen from FIG. 2, the hollow cylinder housing 26a is formed with a port 26f communicating the working chamber 26d to an outlet port 118d of the pressure control valve 22 via the pressure control line 27. Though FIG. 2 does not show clear construction, the upper fluid chamber 26e is defined as an enclosed space and is filled with the viscous working fluid. The pressure of the working fluid in the upper fluid chamber 26e at an initial position of the piston 26c serves as a reference pressure and per se serves as resistance for downward movement of the piston.

The pressure control valve 22 has a valve housing 118 having the aforementioned outlet port 118d, an inlet port 118b and a drain port 118c. Respective inlet port 118b, the drain port 118c and the outlet port 118d are connected to a valve bore 118a defined within the valve housing 118. A valve spool 119 is disposed within the valve bore 118a for thrusting movement therein. The valve spool 119 has first, second and third lands 119a, 119b and 119c. As will be seen from FIG. 2, the third land 119c has smaller diameter than that of the first and second lands 119a and 119b. The third land 119c defines a fifth pressure control chamber 118h which is connected to the drain port 118c via a drain path 118f. An actuator piston 122c is also disposed within the valve bore 118a. The actuator piston 122c opposes the second land 119b in spaced apart relationship to define a second pressure control chamber 118i which is connected to the drain port 118c via a drain path 118e. An annular pressure chamber 118j is defined between the first and second lands 119a and 119b. The pressure chamber 118j is constantly communicated with the outlet port 118d and thus is communicated with working chamber 26D of cylinder 26. On the other hand, the pressure chamber 118j shifts according to shifting of the valve spool 119 to selectively communicate with the inlet port 118b and the drain port 118c. On the other hand, a pressure control chamber 118k is defined between the first and third lands 119a and 119c. The pressure control chamber 118k is in communication with the outlet port 118d via a pilot path 118g. A bias spring 121 is interposed between the actuator piston 122c and the valve spool 119. The actuator piston 122c contacts with an actuator rod 122a of the electrically operable actuator 22a which comprises an electromagnetic solenoid 121. The solenoid 122 comprises a proportioning solenoid.

Figure 3A:
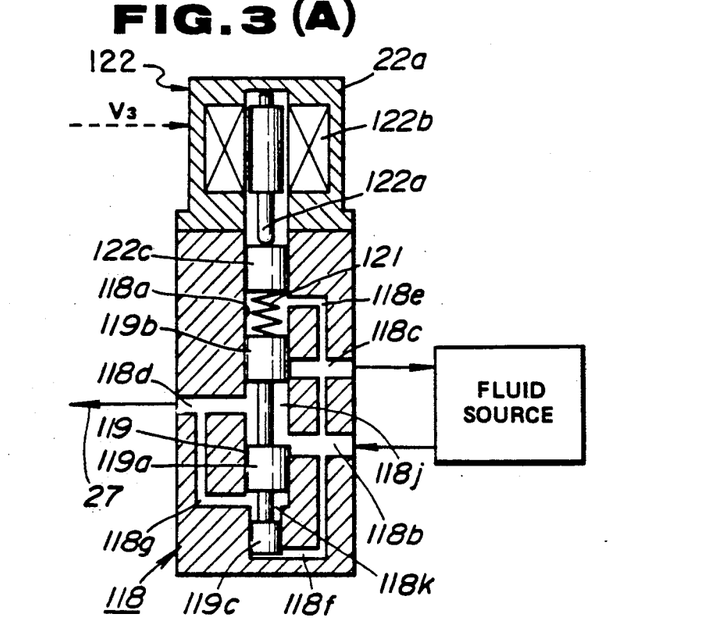

In order to increase the supply pressure of the working fluid, the spool valve 119 is shifted to the position shown in FIG. 3(A) to increase the path area at a throttle constituted at the inner end of the inlet port 118b by means of the land 119a of the spool valve 119. On the other hand, in order to decrease the supply pressure of the working fluid, the pool valve is shifted to the position to decrease the path area at the throttle of the inner end of the inlet port 118b and opens the drain port 118c which is normally blocked by means of the land 119b of the spool valve.

Figure 4:
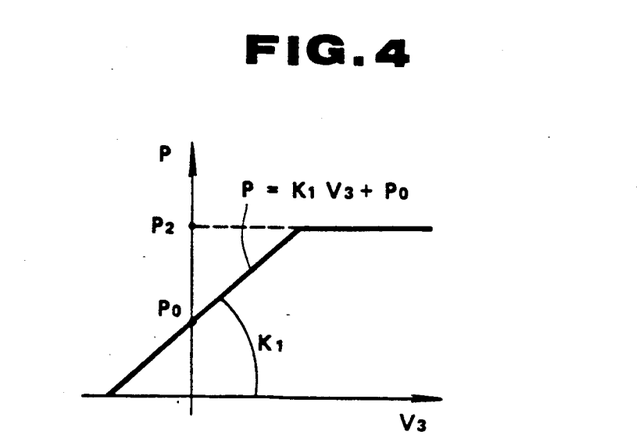
FIG. 4 is a graph showing variation of a hydraulic pressure to be supplied to a pressure control valve according to variation of drive signal voltage.

As seen from FIG. 2, the proportioning solenoid 122 comprises the actuator rod 122a and a solenoid coil 122b. The solenoid coil 122b is energized by suspension control signals from the control unit. In the shown embodiment of the pressure control valve, the working fluid pressure P at the outlet port 118d is variable according to the predetermined variation characteristics. Namely, when the control value represented by the suspension control signal is zero, the pressure at the outlet port 118d becomes an initial pressure determined according to a predetermined offset pressure. When the suspension control signal value in positive value increases, the fluid pressure at the outlet port 118d increases with a predetermined proportioning rate. Namely, by increasing the suspension control value, the actuator rod 122a is driven downwardly as shown FIG. 4 at a magnitude toward position needed to achieve an increase of the fluid pressure P with the predetermined proportioning rate $K_1$ across a predetermined neutral pressure $P_0$. The fluid pressure at the outlet port 118d saturates at the output pressure $P_2$ of the pressure unit as shown in FIG. 4. On the other hand, when the suspension control signal value decreases, the pressure decreases to zero by shifting the actuator rod 122a.

The actuator rod 122a of the proportioning solenoid 122 is associated with the actuator piston 122c. Contact between the actuation rod 122a and the actuator piston 122c can be maintained by the resilient force of the bias spring 121 which normally biases the actuator piston toward the actuation rod. On the other hand, the spring force of the bias spring 121 is also exerted on the valve spool 119 to constantly bias the valve spool downwardly in FIG. 2. The valve spool 119 also receives upward hydraulic force from the pressure control chamber 118k. Therefore, the valve spool 119 is oriented at the position in the valve bore at the position where the downward bias of the bias spring 121 balances with the upward hydraulic force of the pressure control chamber 118k.

Figure 3B:
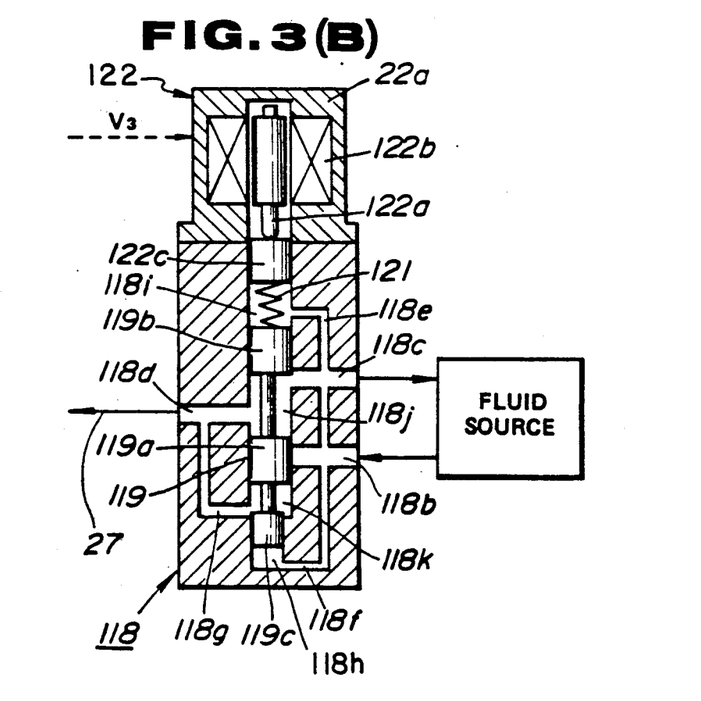

When bounding motion occurs at the suspension member, the piston 26c of the hydraulic cylinder 26 shifts downwardly with respect to cylinder 26 to cause an increase of the fluid pressure in the upper chamber 26d. This causes an increase of the fluid pressure at the outlet port 118d of the pressure control valve 22. As a result, the fluid pressure in the pressure control chamber 118k increases by the pressure introduced through the pilot path 118g to destroy the balance between the downward bias of the bias spring 122d and the upward hydraulic force of the pressure control chamber 118k. This causes upward movement of the valve spool 119 against the spring force of the bias spring 121, as shown in FIG. 3(B). As a result, the path area of the drain port 118c increases and the inlet port 118b becomes blocked. Therefore, the fluid pressure in the working chamber 26d is drained through the drain port. Therefore, the increased fluid pressure in the working chamber 26d of the hydraulic cylinder 26 can be successfully absorbed so that the bounding energy input from the suspension member will not be transmitted to the vehicle body.

When rebounding motion occurs at the suspension member, the piston 26c of the hydraulic cylinder 26 shifts upwardly to cause a decrease of the fluid pressure in the working chamber 26d. This causes a decrease of the fluid pressure at the outlet port 118d of the pressure control valve 22. As a result, the fluid pressure in the pressure control chamber 118k decreases by the pressure introduced through the pilot path 118g to destroy the balance between the downward bias of the bias spring 121 and the upward hydraulic force of the pressure control chamber 118k. This causes downward movement of the valve spool 119 under the spring force of the bias spring 121, as shown in FIG. 3(A). As a result, the path area of the inlet port 118b increases and the drain port 118c becomes blocked. Therefore, the fluid pressure in the working chamber 26d is increased by the pressure introduced through the inlet port. Therefore, the decreased fluid pressure in the working chamber 26d of the hydraulic cylinder 26 can be successfully absorbed so that the rebounding energy input from the suspension member will not be transmitted to the vehicle body.

Here, since no flow resisting element, such as an orifice or a throttling valve, is disposed between the fluid reservoir 40 and the drain port 118c, no damping force against the downward motion of the piston 26c with respect to the hydraulic cylinder 26 will be produced in response to the bounding motion of the suspension member. Since the damping force exerted on the piston 26c may serve to allow transmission of the part of bounding energy to the vehicle body to cause rough ride feeling, the shown embodiment of the suspension system may provide satisfactorily high level riding comfort by completely absorbing the bounding and rebounding energy set forth above.

The control unit further performs anti-rolling, anti-pitching, bouncing suppressive suspension control depending upon various preselected control parameters, such as lateral, longitudinal and vertical accelerations exerted on the vehicular body. For examples, the suspension control technologies are disclosed in the following co-pending applications:

European Patent First Publication No. 0 249 209
European Patent First Publication No. 0 249 227
European Patent First Publication No. 0 283 004
European Patent First Publication No. 0 285 153
European Patent First Publication No. 0 284 053

The inventions disclosed in the foregoing publications have been assigned to the common assignee to the present invention. The disclosure of these publications will be herein incorporated by reference for the sake of disclosure.

In the practical control, the control unit 16 outputs a control current I to be supplied to the actuator 22a of the pressure control valve 22 so as to control the fluid pressure in the working chamber 26d of the hydraulic cylinder 26. The control current I to be derived by the control unit 16 generally comprises a direct current component which is variable of the direct current value depending upon the load on the vehicle body and is so determined as to maintain the vehicular body height level at a predetermined standard height, and an alternating current component which is derived for suppressing attitude change of the vehicular body. Therefore, while the power supply for the control unit 16 is held in a normal condition and control current I is supplied to the actuator 22a, the pressure control valve 22 operates for achieving both height regulation and suppression of attitude change.

The actuator 22a is responsive to the control current I to adjust the position of the actuator piston 122c and thereby adjust the position of the valve spool 119. By this, pressure in the working chamber is adjusted according to the control current I. In the steady state of vehicular driving where no vehicle body attitude change is caused, the control current I is derived simply for regulating the vehicular height level at the predetermined standard height. The hydraulic pressure to be generated in response to the control current I containing only a direct current component, will be referred to as neutral pressure. Therefore, as long as the neutral pressure $P_0$ is supplied to the working chamber 26d, the vehicle body height level is maintained at the predetermined standard height.

The operational one-way check valve 15 is connected to the supply line 21S via an operation line 15a to receive therefrom the hydraulic pressure. The operational one-way check valve 15 is set at a set pressure at a magnitude corresponding to the neutral pressure. The operational one-way check valve 15 is responsive to the fluid pressure in the supply line 21S higher than or equal to the set pressure to open to establish fluid communication between the drain line 21D and the return line 6 and fluid communication between the drain port T of the flow control valve 17 and the return line 3. On the other hand, the operational one-way check valve 15 is responsive to the fluid pressure in the supply line 21S lower than the set pressure, to block fluid communication. Therefore, the fluid pressure in the hydraulic circuit upstream of the operational one-way check valve 15 is maintained at a pressure higher than the set pressure, i.e. neutral pressure. Therefore, in the normal operation, when an engine 1 is running to drive the fluid pump 2, the pressure in the supply line 21S is held higher than the set pressure. Therefore, the operational one-way check valve 15 is held open to permit fluid flow therethrough. On the other hand, when the engine stops, the pressure supplied from the fluid pump 2 becomes zero. Therefore, the operational one-way check valve 15 is closed for blocking fluid communication therethrough. Therefore, the fluid pressure in the working chamber 26d of the hydraulic cylinder 26 is maintained at the neutral pressure to maintain vehicular height at the standard height.

The flow control valve 17 is normally maintained at the supply position for connecting the source line 4 to the supply line 21S for supplying the fluid pressure generated by the fluid pump 2 to the supply line. On the other hand, the actuator 17a of the flow control valve 17 is responsive to the flow control signal commanding fail-safe operation, which signal is generated in response to an absence of the control current I supplied to the actuator 22a of the pressure control valve 22 or dropping of power supply from the power source 21, to switch the valve position from the supply mode position to the fail-safe mode position. At the fail-safe mode position, the supply line 21S is connected to the drain port of the flow control valve 17 and thus connected to the operational one-way check valve 15. Then, the fluid communication between the source line 4 and the supply line 21S is blocked. Therefore, the fluid pressure supplied from the fluid pump 2 is returned to the reservoir via the pressure regulation valve 5. When the fluid pressure in the supply line 21S is held higher than the neutral pressure, the operational one-way check valve 15 is held open to return the portion of hydraulic pressure in the supply line 21S in excess of the neutral pressure is returned to the reservoir. As a result, the fluid pressure in the supply line 21S becomes equal to the neutral pressure.

Therefore, in the shown embodiment, the vehicular height level can be maintained at the neutral height level when the electric power circuit is damaged so as not to supply the control current I to the pressure control valve, or power source circuit is shut down.

Figure 5:
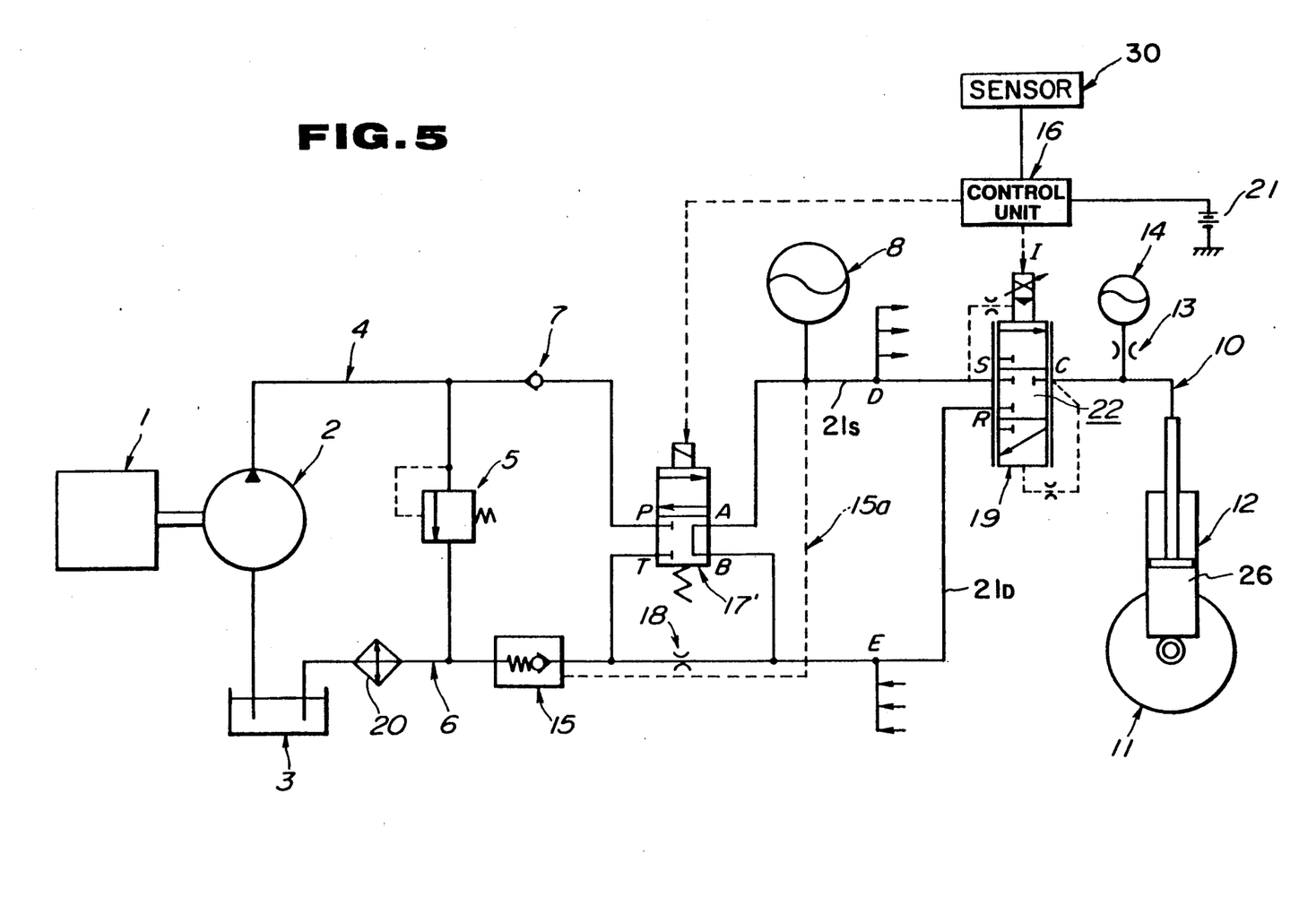
FIG. 5 is a diagrammatic illustration of a second embodiment of a hydraulic circuit employed in the actively controlled suspension system according to the invention.

FIG. 5 shows the second embodiment of a hydraulic circuit of the actively controlled suspension system according to the present invention. In this embodiment, the valve device differs from that of the first embodiment in that the hydraulic circuit connection through the flow control valve 17' is modified in order to prevent the hydraulic circuit from causing chattering in fail-safe mode operation. Namely, when the flow control valve 17 in the former embodiment is switched from the supply mode to the fail-safe mode, pressure at the inlet of the operational one-way check valve 15 is directly subject to the operation line 15a to cause opening of the operational one-way check valve, subsequently closing of the operational one-way check valve due to lowering of pressure and then subsequently opening of the operational one-way check valve due to rising of the pressure at the inlet.

In order to prevent chattering, the shown embodiment provides a pressure difference between the pressure in the operation line 15a and the pressure at the inlet of the operational one-way check valve 15 For achieving this, the flow control valve 17' employed in the shown embodiment has an additional port B connected to the drain line 21D. An orifice 18 is provided in the drain line 21D at a position downstream of junction connected to the port B of the flow control valve 17'.

In the normal condition, the drain line 21D is connected to the return line 6 via the orifice 18 and the operational check valve 15 and via the ports B and T in the normal mode position. On the other hand, the source line 4 is communicated with the supply line 21S. Therefore, the normal mode operation to be performed in the shown embodiment is substantially the same as that of the former embodiment.

On the other hand, in the fail-safe mode position, the port A connected to the supply line 21S is connected to the port B. This communication between the ports A and B permits the pressurized fluid in the supply line 21S to flow therethrough to the operational one-way check valve 15 via the orifice 18. Since the fluid flow through the orifice 18 is limited, the fluid pressure in the hydraulic circuit upstream of the orifice 18 is regulated before flowing through the orifice. This makes fluid pressure variation moderate to prevent the operational one-way check valve from causing chattering.

Figure 6:
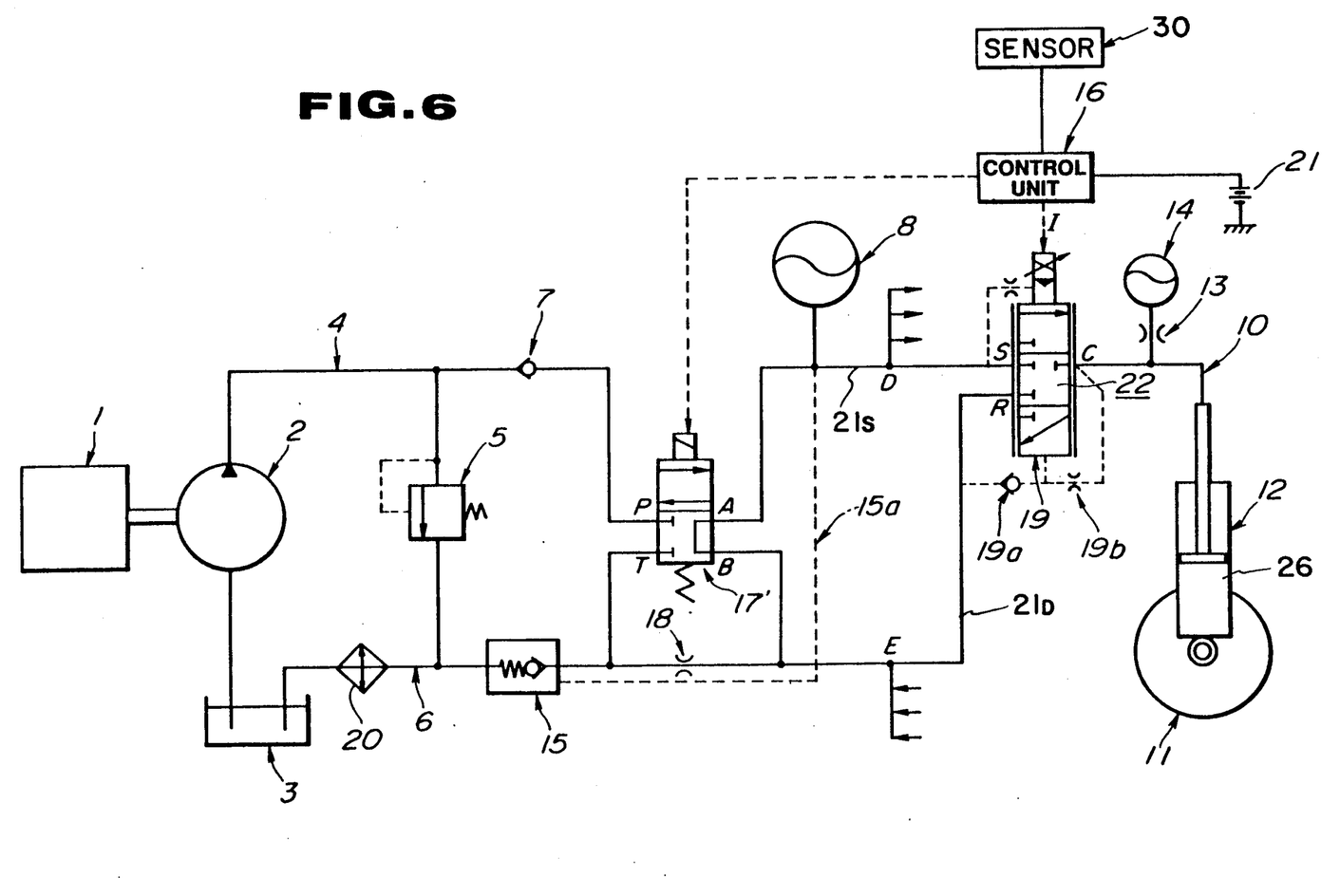
FIG. 6 is a diagrammatic illustration of a third embodiment of a hydraulic circuit employed in the actively controlled suspension system according to the invention.
Figure 7:
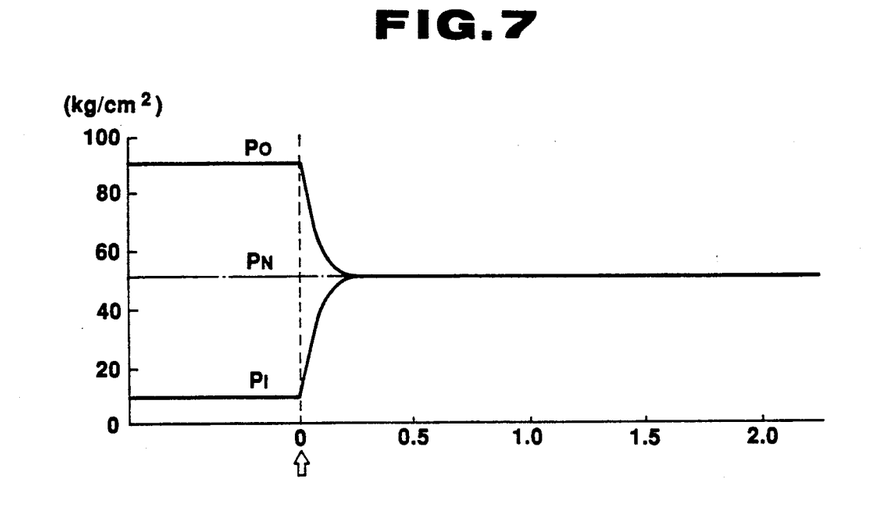
FIG. 7 is a chart showing variation of fluid pressures in hydraulic cylinders in the aforementioned first and second embodiments of the hydraulic circuits, which cylinders are associated with inner and our wheels in turning upon initiation of fail-safe operation.
Figure 8:
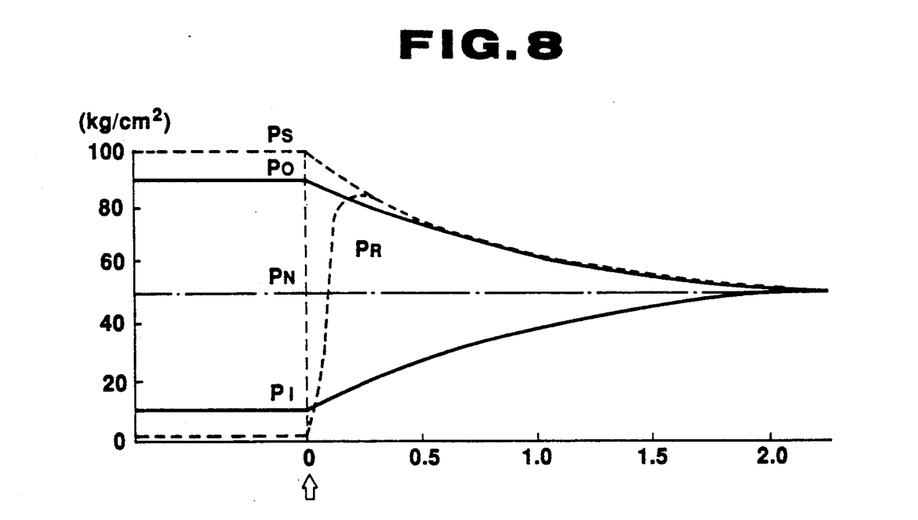
FIG. 8 is a chart showing variation of fluid pressures in hydraulic cylinders in the aforementioned third embodiment of the hydraulic circuit, which cylinders are associated with inner and our wheels in turning upon initiation of fail-safe operation.

FIG. 6 shows the third embodiment of the hydraulic circuit according to the present invention. The shown embodiment is constructed by further modifying the foregoing second embodiment of the hydraulic circuit. Basically, the third embodiment of the hydraulic circuit prevents the vehicle body from causing abrupt attitude change or from causing substantial unstability when failure of the electric system is caused during cornering or deceleration. Namely, for example, when lateral acceleration is exerted on the vehicle body during cornering, the fluid pressure in the working chamber of the hydraulic cylinder which suspends the inner wheel is reduced to soften suspension characteristics and the fluid pressure in the working chamber of the hydraulic cylinder which suspends the outer wheel is increased to harden suspension characteristics, in the normal anti-rolling control. When fail-safe operation is taken place in response to failure of the electric system, fluid pressures in both working chambers are changed to the neutral pressure. This allows rolling of the vehicle to clearly degrade vehicle driving stability.

In order to avoid such defects, one-way check valve 19a is provided to permit fluid flow from the drain line 21D to the outlet port 118d of the pressure control valve 22. As seen from FIG. 6, the one-way check valve 19a is designed to be responsive to a pressure difference between the working chamber 26d and the drain line 21D to permit fluid flow from the drain line 21D to the working chamber when the pressure in the working chamber is lower than the pressure in the drain line 21D.

For instance, in the anti-rolling control, the fluid pressure in the working chamber 26d of the hydraulic cylinder suspending the inner wheel will have fluid pressure lower than the neutral pressure. Therefore, in the fail-safe mode operation, in which the pressure in the supply and drain lines 21S and 21D is adjusted at the neutral pressure. Then, the fluid pressure in the drain line 21D flows through the one-way check valve 19a. An orifice 19b is provided at a position downstream of the one-way check valve. The orifice 19 serves for restricting fluid flow therethrough so as to vary the fluid pressure in the working chamber moderately.

On the other hand, the working chamber 26d of the hydraulic cylinder suspending the outer wheel will have fluid pressure higher than the neutral pressure in anti-rolling operation. When failure of the electric system occurs during anti-rolling operation, the pressure fed back from the outlet port 118d to the pressure control chamber 118k becomes higher than the fluid pressure in the inlet port 118b and the drain port 118c. Therefore, the valve spool 119 is shifted to establish fluid communication between the outlet port 118d to the drain port 118c. As set out with respect to the second embodiment, the fluid pressure in the drain line 21D is lowered moderately by the effect of the flow control valve 17' and the orifice 18.

Therefore, according to the third embodiment, abrupt changes of the vehicular attitude will never occur even when the electric system fails during anti-rolling, anti-pitching or other attitude change suppressive operation.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

What is claimed is:

1. An actively controlled suspension system comprising:
   a suspension system interposed between a vehicular body and a suspension member rotatably supporting a vehicular wheel, said suspension system including a variable pressure chamber which is filled with a working fluid and which is variable of the pressure of said working fluid across a predetermined neutral pressure within said variable pressure chamber for varying suspension characteristics;
   a fluid circuit means, connected to said variable pressure chamber and to a fluid pressure source, which circulates pressurized fluid in a fluid circuit;
   a first valve means disposed in said fluid circuit and variable of valve position for adjusting pressure supply for said variable pressure chamber from said fluid circuit, said first valve means having a first port connected to said fluid pressure source via a supply line of said fluid circuit for supplying the pressurized fluid therethrough, a second port connected to said fluid pressure source via a drain line for draining pressurized fluid therethrough, and a third port connected to said variable pressure chamber via a pressure control line;
   a second valve means disposed between said first valve means and said fluid pressure source, for permitting fluid flow from said pressurized fluid source to said first valve means and for blocking fluid flow in the opposite direction in a first mode, and, in a second mode, for permitting fluid flow from said first valve means to said pressurized fluid source when the fluid pressure at said supply line is higher than a predetermined threshold level and for concurrently blocking fluid flow in the opposite direction, and for blocking fluid communication between said pressurized fluid source and said first valve means when the fluid pressure at said supply line is lower than or equal to said threshold level;

a sensor means for monitoring a preselected suspension control parameter to produce a sensor signal representative thereof;

a fail detector means for monitoring a control signal supplied to said first valve means and for detecting an abnormality of said control signal; and a controller means for normally operating to produce said control signal on the basis of said sensor signal for adjusting pressure to be introduced into said first valve means and thus for adjusting suspension characteristics in order to suppress attitude change in said vehicular body, and said controller means being responsive to said detector means detecting an abnormality of said control signal, to output a line pressure control signal to be fed to said second valve means for switching the valve position of said second valve means from said first position to said second position in order to maintain the line pressure in said fluid circuit at a pressure higher than or equal to said predetermined threshold level.

2. An actively controlled suspension system as set forth in claim 1, wherein said second valve means comprises a fluid pressure responsive valve means which permits fluid flow from said first valve means to said fluid pressure source when said fluid pressure at said supply line is higher than said predetermined threshold level which corresponds to said neutral pressure and blocks fluid flow from said first valve means to said fluid pressure source when said fluid pressure is lower than or equal to said neutral pressure.

3. An actively controlled suspension system as set forth in claim 1, wherein said fluid pressure source further comprises a pressure regulation valve means having a set pressure higher than said neutral pressure, wherein the maximum fluid pressure to be supplied to said fluid circuit via said second valve means at said first position corresponds to said set pressure of said pressure regulation valve.

4. An actively controlled suspension system as set forth in claim 1, which further comprises a pressure accumulator means connected to to said fluid circuit for accumulating fluid pressure therein, said pressure accumulator means being oriented between said first and second valve means.

5. An actively controlled suspension system comprising:

a suspension system interposed between a vehicular body and a suspension member rotatably supporting a vehicular wheel, said suspension system including a hydraulic cylinder defining therein a variable pressure chamber which is filled with a hydraulic working fluid and which is variable of the pressure across a predetermined neutral pressure within said variable pressure chamber for varying suspension characteristics;

a hydraulic circuit means, connected to said variable pressure chamber and to a fluid pressure source, which circulates pressurized fluid in a fluid circuit, said hydraulic circuit means including first and second supply lines for supplying pressurized fluid to said variable pressure chamber and first and second drain lines for returning pressurized fluid from said variable pressure chamber to said pressurized fluid source;

a first valve means disposed in said fluid circuit and connected to said variable pressure chamber via a pressure control line, and being variable of valve position for adjusting pressure supply for said variable pressure chamber from said fluid circuit, said first valve means having a first port connected to said fluid pressure source via said first supply line of said fluid circuit for supplying the pressurized fluid therethrough, a second port connected to said fluid pressure source via said first drain line for draining pressurized fluid therethrough, and a third port connected to said variable pressure chamber via said pressure control line;

a second valve means disposed within said fluid circuit and having a first port connected to said first supply line, a second port connected to said second supply line and a third port connected one of said first and second drain lines, said second valve means selectively establishing fluid communication between said first and second ports at a first mode position and between said first and third port at a second mode position, said first mode position being selected for permitting fluid flow from said pressurized fluid source to said first valve means via said first and second supply lines and for blocking fluid flow from said first supply line to said first drain line, and said second mode position being selected for permitting fluid flow from said first supply line to said pressurized fluid souce via said first and second drain lines;

a third valve means, disposed between said first and second drain lines and responsive to fluid pressure in said first supply line higher than a preset neutral pressure of said variable pressure chamber, for permitting fluid flow from said first drain line to said second drain line and for blocking fluid communication between said first and second drain lines when said fluid pressure in said first supply line is lower than or equal to said neutral pressure at said variable pressure chamber;

a sensor means for monitoring a preselected suspension control parameter to produce a sensor signal representative thereof;

a fail detector means for monitoring a control signal supplied to said first valve means and for detecting an abnormality of said control signal; and a controller means for normally operating to produce said control signal on the basis of said sensor signal for adjusting pressure to be introduced into said first valve means and thus for adjusting suspension characteristics in order to suppress attitude change in said vehicular body, and said controller means being responsive to said detector means detecting an abnormality of said driver signal, to output a line pressure control signal to be fed to said second valve means for switching valve position from said first mode position to said second mode position in order to maintain the line pressure in said fluid circuit at said a predetermined value.

6. An actively controlled suspension system as set forth in claim 5, wherein said fluid pressure source further comprises a pressure regulation valve means having a set pressure higher than said neutral pressure, and wherein the maximum fluid pressure to be supplied to said fluid circuit vai said second valve means at said first mode position corresponds to said set pressure of said pressure regulation valve.

7. An actively controlled suspension system as set forth in claim 5, which further comprises a pressure accumulator means connected to to said fluid circuit for accumulating fluid pressure therein, said pressure accumulator means being oriented between said first and second valve means.

8. An actively controlled suspension system comprising:
   a suspension system interposed between a vehicular body and a suspension member rotatably supporting a vehicular wheel, said suspension system including a variable pressure chamber which is filled with a working fluid and which is variable of the pressure of said working fluid across a predetermined neutral pressure within said variable pressure chamber for varying suspension characteristics;
   a fluid circuit means, connected to said variable pressure chamber and to a fluid pressure source, which circulates pressurized fluid in a fluid circuit;
   a first valve means disposed in said fluid circuit and variable of valve position for adjusting pressure supply for said variable pressure chamber from said fluid circuit, said first valve means having a first port connected to said fluid pressure source via a supply line of said fluid circuit for supplying the pressurized fluid therethrough, a second port connected to said fluid pressure source via a drain line for draining pressurized fluid therethrough, and a third port connected to said variable pressure chamber via a pressure control line;
   a second valve means connected to said drain line of said fluid circuit and said fluid pressure source, for permitting fluid flow from said pressurized fluid source to said first valve means and for blocking fluid flow in the opposite direction at first valve position, and, in a second mode, for permitting fluid flow from said first valve means to said pressurized fluid source when the fluid pressure at said supply line is higher than a predetermined threshold level and for concurrently blocking fluid flow in the opposite direction;
   a flow restriction means, disposed within said drain line, for limiting fluid flow therethrough from said drain line to said fluid pressure source and for regulating fluid pressure in said supply line and said drain line;
   a sensor means for monitoring a preselected suspension control parameter to produce a sensor signal representative thereof;
   a fail detector means for monitoring a control signal supplied to said first valve means and for detecting an abnormality of said control signal; and
   a controller means for normally operating to produce said control signal on the basis of said sensor signal for adjusting pressure to be introduced into said first valve means and thus for adjusting suspension characteristics in order to suppress attitude change in said vehicular body, and said controller means being responsive to said detector means detecting an abnormality of said driver signal, to output a line pressure control signal to be fed to said second valve means for switching valve position from said first position to said second position in order to maintain the line pressure in said fluid circuit at a pressure higher than or equal to said predetermined threshold level.

9. An actively controlled suspension system as set forth in claim 8, which further comprises a bypass circuit with pressure difference responsive valve means for bypassing said first valve means for directly connecting said drain line to said pressure control line, said pressure difference responsive valve means being responsive to the fluid pressure in said drain line higher than the fluid pressure in said pressure control line for establishing fluid communication and being responsive to the fluid pressure in said pressure control line higher than that in said drain line for blocking fluid communication.

10. An actively controlled suspension system as set forth in claim 9, which further comprises a flow restricting means disposed within said bypass circuit downstream of said pressure difference responsive valve means for limiting fluid flow through said bypass circuit when fluid communication is established by said pressure difference responsive valve means.

11. An actively controlled suspension system comprising:
   a suspension system interposed between a vehicular body and a suspension member rotatably supporting a vehicular wheel, said suspension system including a hydraulic cylinder defining therein a variable pressure chamber which is filled with a hydraulic working fluid and which is variable of the pressure across a predetermined neutral pressure within said variable pressure chamber for varying suspension characteristics;
   a hydraulic circuit means, connected to said variable pressure chamber and to a fluid pressure source, which circulates pressurized fluid in a fluid circuit, said hydraulic circuit means including first and second supply lines for supplying pressurized fluid to said variable pressure chamber and first and second drain lines for returning pressurized fluid from said variable pressure chamber to said pressurized fluid source;
   a first valve means disposed in said hydraulic circuit means and connected to said variable pressure chamber via a pressure control line, and being variable of valve position for adjusting pressure supply for said variable pressure chamber from said fluid circuit, said first valve means having a first port connected to said fluid pressure source via said first supply line of said fluid circuit for supplying the pressurized fluid therethrough, a second port connected to said fluid pressure source via said first drain line for draining pressurized fluid therethrough, and a third port connected to said variable pressure chamber via said pressure control line;
   a second valve means disposed within said fluid circuit and having a first port connected to said first supply line, a second port connected to said second supply line and a third port connected one of said first and second drain lines, said second valve means selectively establishing fluid communication between said first and second ports at a first mode position and between said first and third port at a second mode position, said first mode position being selected for permitting fluid flow from said pressurized fluid source to said first valve means via said first and second supply lines and for blocking fluid flow from said first supply line to said first drain line, and said second mode position being selected for permitting fluid flow from said first supply line to said pressurized fluid source via said first and second drain lines;

a third valve means, disposed between said first and second drain lines and responsive to fluid pressure in said first supply line higher than a preset neutral pressure of said variable pressure chamber, for permitting fluid flow from said first drain line to said second drain line and for blocking fluid communication between said first and second drain lines when said fluid pressure in said first supply line is lower than or equal to said neutral pressure at said variable pressure chamber;

a flow restriction means, disposed within said first drain line upstream of said third valve means, for limiting fluid flow therethrough and for regulating fluid pressure in said fluid circuit upstream thereof;

a sensor means for monitoring a preselected suspension control parameter to produce a sensor signal representative thereof;

a fail detector means for monitoring a control signal supplied to said first valve means and for detecting an abnormality of said control signal; and a controller means for normally operating to produce said control signal on the basis of said sensor signal for adjusting pressure to be introduced into said first valve means and thus for adjusting suspension characteristics in order to suppress attitude change in said vehicular body, and said controller means being responsive to said detector means detecting an abnormality of said control signal, to output a line pressure control signal to be fed to said second valve means for switching the valve position of said second valve means from said first mode position to said second mode position in order to maintain the line pressure in said fluid circuit at said a predetermined value.

12. An actively controlled suspension system as set forth in claim 11, which further comprises a bypass circuit with pressure difference responsive valve means for bypassing said first valve means for directly connecting said drain line to said pressure control line, said pressure difference responsive valve means being responsive to the fluid pressure in said drain line higher than the fluid pressure in said pressure control line for establishing fluid communication and being responsive to the fluid pressure in said pressure control line higher than that in said drain line for blocking fluid communication.

13. An actively controlled suspension system as set forth in claim 12, which further comprises a flow restricting means disposed within said bypass circuit downstream of said pressure difference responsive valve means for limiting fluid flow through said bypass circuit when fluid communication is established by said pressure difference responsive valve means.

* * * * *